March 21, 1944. W. B. MOORE 2,344,558
PHOTOGRAPHIC ENLARGER
Filed July 22, 1940 4 Sheets-Sheet 3
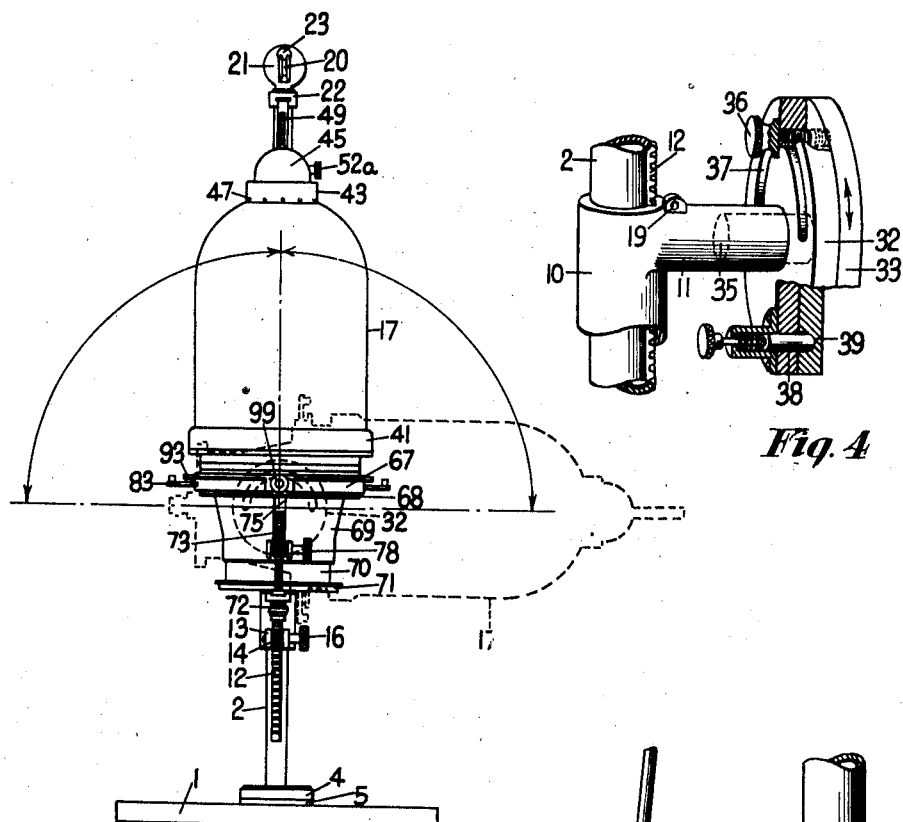
Fig. 4
Fig. 3
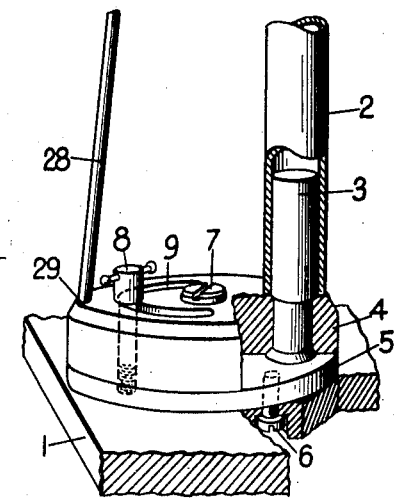
Fig. 6
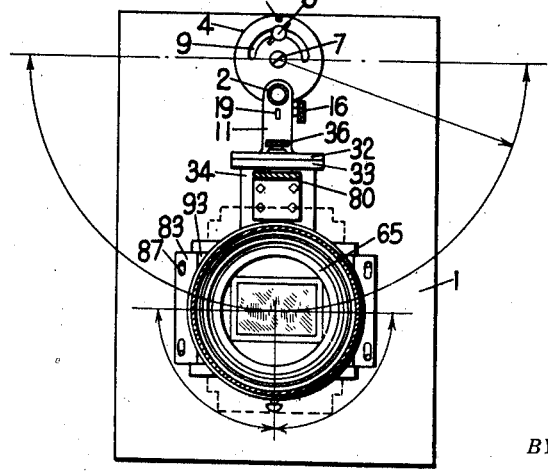
Fig. 5
INVENTOR
Walter B. Moore
BY
ATTORNEYS

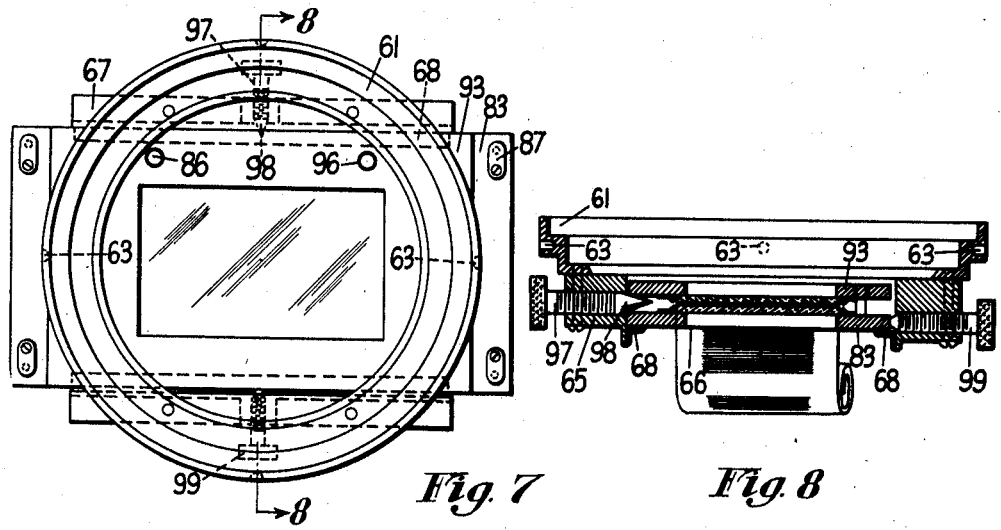
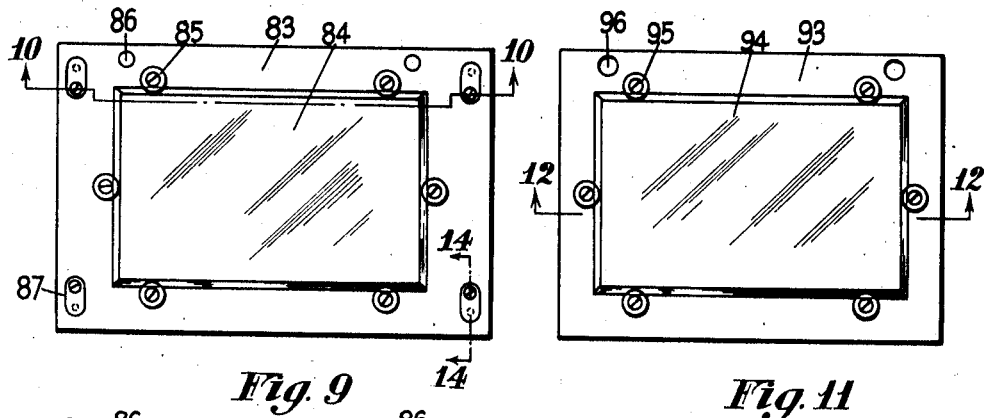
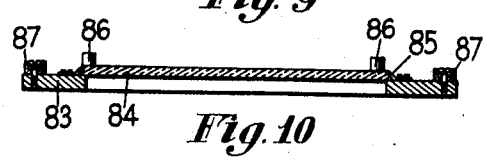
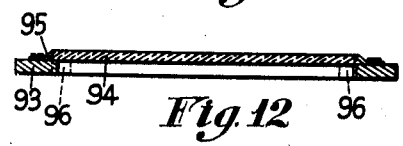
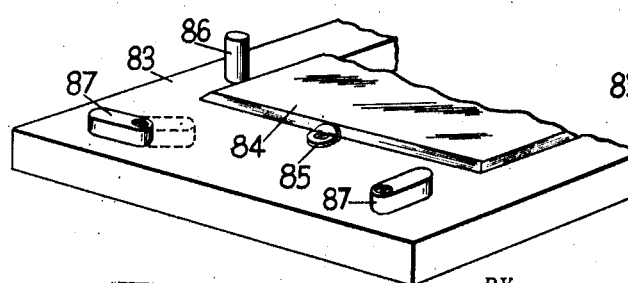
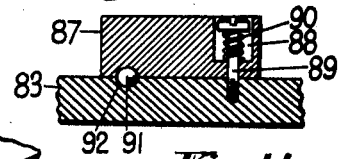

Patented Mar. 21, 1944

2,344,558

UNITED STATES PATENT OFFICE 2,344,558

PHOTOGRAPHIC ENLARGER

Walter B. Moore, Coshocton, Ohio

Application July 22, 1940, Serial No. 346,727

3 Claims. (Cl. 88—24)

My invention relates to a photographic enlarger. It has to do, more particularly, with an enlarger of the reflector type which can be used for producing large prints from comparatively small negatives.

In the past, there have been many different types of enlargers provided. However, all of these prior art enlargers are possessed of certain undesirable features. One of the greatest disadvantages of most prior art enlargers resides in the fact that it has been impossible to adjust them to properly position the image on the printing paper, used with the enlarger. For example, it is desirable for the image to be positioned upright relative to the operator of the enlarger rather than to have the operator move to different positions around the enlarger to properly view the image. Prior art enlargers with which I am familiar have not been capable of adjustment to overcome this difficulty. Another disadvantage of prior art enlargers resides in the fact that they have not been capable of quick and effective adjustment to position the image on a vertical surface, such as a wall surface, or on the floor in order to produce very large prints. Also, prior art enlargers have not been provided with proper adjustments for moving the enlarger horizontally and vertically relative to the base. Another disadvantage of the prior art enlargers resides in the fact that sufficient means have not been provided for adequately protecting the negative against the intense heat developed by the lamp of the enlarger. Still another advantage of prior art enlargers is due to the fact that adequate means have not been provided for adjusting the lamp in order to focus it while still maintaining a reflecting surface properly associated therewith.

One of the objects of my invention is to provide an enlarging device of the type indicated which is very effective for the purpose for which it is intended but which is comparatively simple.

Another object of my invention is to provide an enlarger of the type indicated which may be easily and quickly adjusted to properly position the image so that it can be readily viewed by the operator without changing his position relative to the enlarger.

Another object of my invention is to provide an enlarger which has means associated therewith so that it can be quickly and accurately adjusted to position the image on a base plate associated therewith, a vertical surface, or on the floor or other surface.

Another object of my invention is to provide a photographic enlarger of the type indicated which is provided with easily operated accurate adjustments for positioning the enlarger horizontally and vertically relative to the base plate on which the printing paper is mounted.

Another object of my invention is to provide an enlarger which has means associated therewith for adequately protecting the negative against the intense heat developed by the lamp of the enlarger.

Another object of my invention is to provide an enlarger of the type indicated having means associated therewith for properly focusing the light produced by the lamp thereof while still maintaining a reflecting surface properly associated with the lamp.

In its preferred form, my invention contemplates the provision of a photographic enlarger which embodies a horizontally disposed base upon which the sensitized printing paper is adapted to be mounted. This base carries a vertically disposed post upon which the enlarging apparatus itself is mounted. The enlarging apparatus may be accurately and quickly adjusted to any desired vertical position on the post. Furthermore, the post is so mounted on the base that the enlarging apparatus may be swung to such a position that it will project the image on the floor rather than on the base plate. The enlarging apparatus is so carried by the post that it may be swung about a horizontal axis to position the image on a vertical surface, such as a wall surface.

The enlarging apparatus itself comprises a main housing which has a lamp support at the upper end thereof and a negative support at the lower end thereof. The lamp support is adjustable so as to properly focus the light on the negative and is provided with a reflector which is always in a fixed position relative to the lamp in order that the light will always be reflected properly. I provide heat resting glass between the lamp and the negative to protect the negative from the heat developed by the lamp. Also, for this purpose, I provide means for creating a curtain of air above the negative. The negative is supported in the enlarger in such a manner that it may be readily rotated about a vertical axis to properly position the image relative to the operator. Below the negative support I provide a telescoping tubular housing which carries a lens system at its lower end for magnifying the image of the negative.

Various other objects will be apparent hereinafter.

The preferred embodiment of my invention is illustrated in the accompanying drawings wherein similar characters of reference designate corresponding parts and wherein:

Figure 3 is a side elevational view illustrating by dotted lines how the enlarging apparatus may be swung about a horizontal axis.

Figure 4 is an enlarged detail, partly in side elevation and partly in vertical section, illustrating the mounting which permits the adjustment illustrated in Figure 3.

Figure 5 is a view partly in horizontal section and partly in plan illustrating how the enlarger apparatus may be swung about a vertical axis so as to project the image on the floor.

Figure 6 is a detail in perspective, partly broken away, illustrating the mounting which permits the adjustment indicated in Figure 5.

Figure 7 is a horizontal sectional view taken substantially along line 7—7 of Figure 1 and illustrating the negative holder.

Figure 8 is a transverse vertical sectional view taken substantially along line 8—8 of Figure 7.

Figure 9 is a top plan view of the lower section of the negative holder.

Figure 10 is a sectional view taken substantially along line 10—10 of Figure 9.

Figure 11 is a plan view of the upper section of the negative holder.

Figure 12 is a sectional view taken substantially along line 12—12 of Figure 11.

Figure 13 is an enlarged detail in perspective of an end portion of the structure shown in Figure 9.

Figure 14 is a sectional view taken substantially along line 14—14 of Figure 9.

Figure 1:
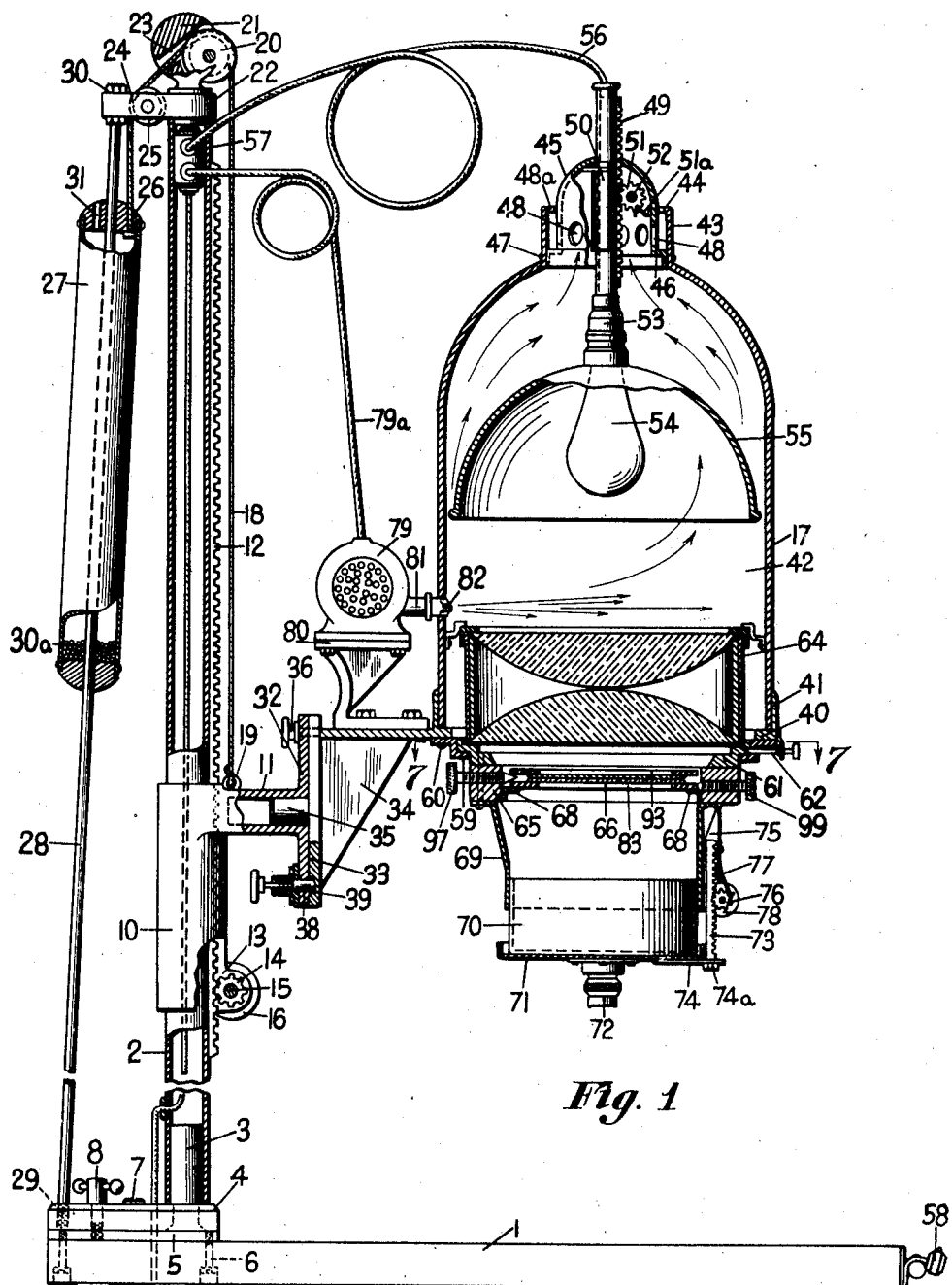
Figure 1 is a view partly in vertical section and partly in side elevation illustrating an enlarger constructed in accordance with my invention.
Figure 2:
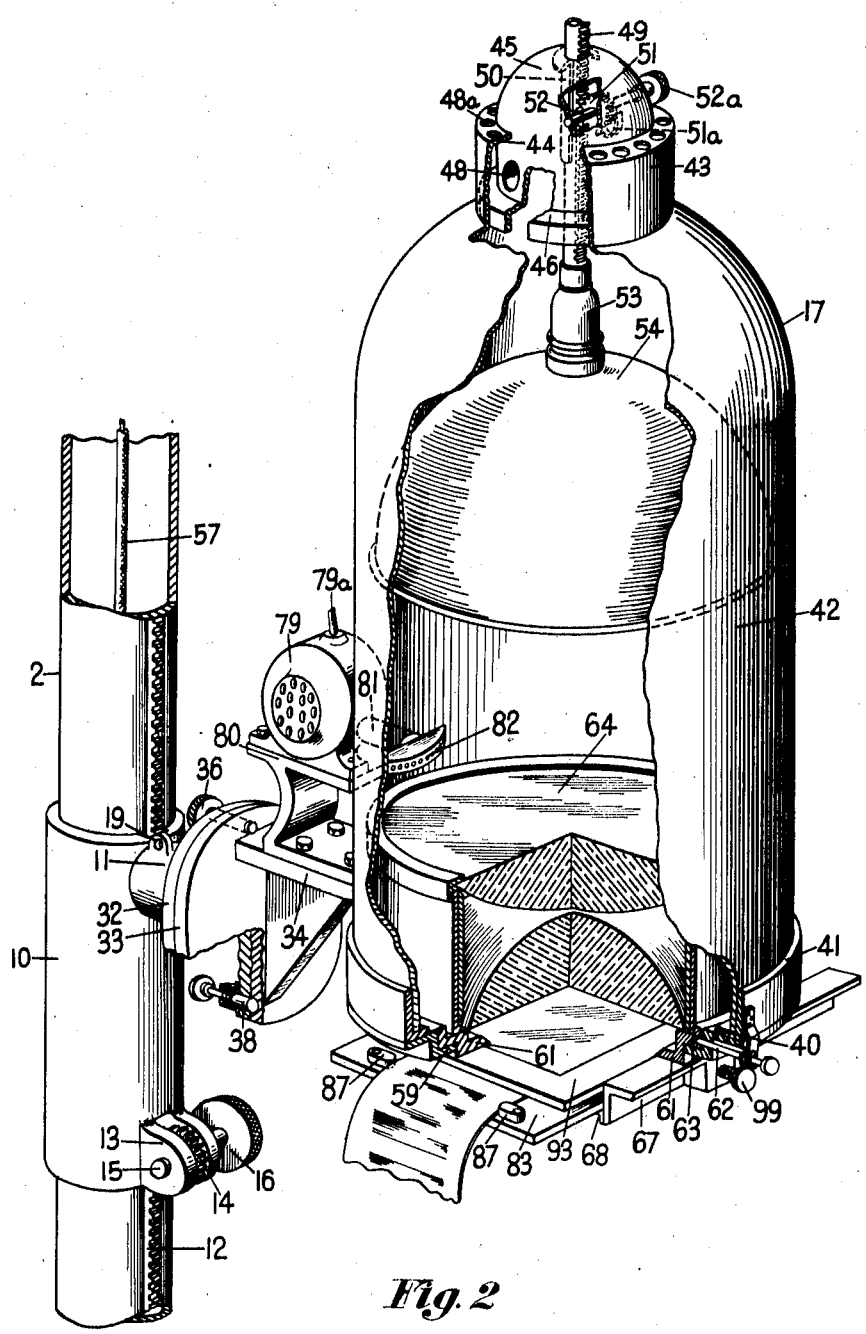
Figure 2 is a perspective view, partly broken away, illustrating the upper portion of the enlarger.

With reference to the drawings and particularly to Figure 1, I have illustrated my photographic enlarger as comprising a flat base 1 which is horizontally disposed. Suitable means may be provided for holding the sensitized printing paper on the upper surface of the base.

The base 1 carries a vertical standard or post which may be indicated generally by the numeral 2. This post or standard 2 is carried at the lefthand side (Figure 1) of the base 1 substantially midway between the front and rear edges thereof. The post 2 is in the form of a hollow shaft and has its lower end slipped over an upstanding stub 3 which is carried by a disk member 4 adjacent the peripheral edge thereof. The members 2 and 3 are preferably keyed together to prevent relative rotation thereof. The disk 4 preferably rests on a disk-like bearing plate 5 which may be secured to the upper surface of the base 1 in any suitable manner such as by bolts 6 illustrated in Figures 1 and 6. The disk 4 is pivoted to the disk 5 by means of a pin 7. For locking the members 4 and 5 together when desired, a clamping bolt 8 is provided which is threaded into the member 5 and which passes upwardly through a semi-circular slot 9 provided in the member 4. The slot 9 will permit rotation of the member 4 relative to the member 5 through an angle of 180° and when the screw 8 is tightened the member 4 will be clamped in its adjusted position on the member 5.

A sleeve 10 is disposed in surrounding relationship to the post 2. The sleeve carries an outwardly projecting tubular extension 11 which is horizontally disposed. Means is provided for adjusting the sleeve vertically on the post 2 and holding it in adjusted position. This means also prevents rotation of the sleeve 10 on the post 2. This means comprises a rack portion 12 which is formed on the post 2 and which extends substantially the full height thereof. The lower end of the sleeve 10 is slotted and lugs 13 are formed thereon at opposite sides of the slot. Between these lugs is disposed a pinion 14 which is carried by a pin 15 disposed in aligning openings formed in the lugs. This pinion 14 extends through the slot and meshes with the rack 12. The pin 15 has a knurled knob 16 keyed on one end thereof by means of which it may be rotated. Rotation of the pin 15 will cause rotation of the pinion 14 which is keyed thereto. This will produce vertical movement of the sleeve 10 on the post 2.

The extension 11 of sleeve 10 is adapted to support the enlarging apparatus which may be indicated generally by the numeral 17. I provide means for counterbalancing the weight of this apparatus to facilitate vertical adjustment of the sleeve 10 on the post 2 and to hold it in any position to which it is adjusted by means of the pinion and rack structure. This counterbalance structure comprises a cord 18 which has its one end secured to a lug 19 on the extension 11. This cord 18 extends upwardly along the post and over a grooved roller 20 at the upper end of the post. This grooved roller 20 is rotatably disposed in a vertical slot formed in a spherical member 21 disposed on a bracket 22 which is suitably mounted on the upper end of the post 2. The member 21 is further provided with an opening 23 through which the cord extends. The bracket 22 is provided with a horizontal extension 24 which carries a second grooved roller 25 over which the cord 18 passes. The end of the cord is secured at 26 to the upper end of a counterbalance weight structure 27.

This counterbalance weight structure is in the form of a tubular housing which is slidably mounted for vertical movement on a rod 28. This rod has its threaded lower end 29 screwed into the disk member 5. Its upper end is fastened to the bracket 22 as at 30. The housing 27 is adapted to receive shot 30a which may be added until the counterbalance structure exactly counterbalances the weight of the unit 17. An opening 31 may be provided in the upper end of the housing 27 through which the shot may be dropped into the housing.

The extension 11 of the sleeve 10 is provided with a vertically disposed disk 32 on its outer end. A second disk 33 is disposed in contact with the outer surface of the disk 32. This disk 33 has a bracket portion 34 formed integral therewith and which is adapted to support the unit 17. The disk 33 is provided with a centrally disposed stud 35 which extends into the extension 11 and is suitably held therein. The stud 35 is adapted to freely rotate in the extension 11. For clamping the disks 32 and 33 together, a clamping bolt 36 is provided. This bolt 36 is threaded into the disk 33. It extends through an arcuate slot 37 in the disk 32. The arcuate slot 37 is semicircular so as to prevent the disk 33 to be rotated relative to the disk 32 at an angle of 180°. When the bolt 36 is tightened, the disks will be clamped together and relative rotation thereof will be precluded. For readily positioning the disks 32 and 33 relative to each other in such a manner that the unit 17 is upright, I provide a spring pressed plunger 38 which is carried by the disk 32 and projects through the opening formed therein. The inner end of the plunger will snap into a socket 39 formed in the inner surface of the disk 33 when the unit 17 is upright.

The bracket 34 carries a ring 40 which is normally horizontally disposed. This ring 40 is provided with an upstanding flange 41 within which the lower end of a bell shaped housing 42 is disposed. This housing 42 is preferably made of sheet metal and its inner surface is preferably coated with a black enamel so as to substantially eliminate reflection by such surface. This housing 42 is constructed so that it will be substantially light tight so as to prevent the passage of light in and out of the housing. The upper end of the housing is provided with a cylindrical extension 43, which has an inwardly directed horizontal flange 44 on its upper end. Within this extension 43, I dispose a dome-shaped member 45 which has a horizontal outwardly extending flange 46 on its lower end. The flange 46 is riveted to the wall of extension 43 as at 47. The vertical portion of the wall of member 45 is provided with vent apertures 48. The horizontal flange 44 of extension 43 is provided with vent apertures 48a. Thus, it will be apparent that the vent apertures are so arranged as to permit the passage of air to and from the housing 42 but to preclude the passage of light to and from the housing through these apertures.

A rack member 49 is mounted on a guide portion 50 carried by the member 45. This rack member extends through an opening in the top of member 45 and is free to move vertically in the guide portion 50. A pinion 51 engages the rack surface on the member 49 and keeps it in position in the guide 50. This pinion 51 is carried by a pin 52 to which it is keyed and this pin is rotatably carried by the member 45. A spring member 51a normally prevents rotation of the pinion. The pin has a knurled knob 52a keyed on its outer end by means of which it may be rotated. Thus, the member 49 may be vertically adjustable.

The member 49 extends downwardly and its lower end is disposed within the upper end of the housing 42. The lower end of member 49 carries a socket member 53 which is adapted to receive an electric light bulb 54. The socket member 53 also carries a reflector 55. The reflector 55 is preferably formed of sheet metal and its inner surface is preferably coated with a white vitreous enamel so that it will have a high degree of reflectivity. The reflector 55 and the bulb 54 will always be in the same relative positions. When the member 49 is adjusted vertically, they will be adjusted vertically as a unit. The member 49 is hollow so that an electric conduit 56 may pass upwardly from the socket 53 and through such member. The conduit 56 extends through an opening in the upper end of the post and is connected to a conduit 57 which leads downwardly through the post and underneath the base 1 to a switch 58 at one side of the base. The ring 40 has a second ring 59 fastened to the lower surface thereof by means of screws 60. This ring 59 is angular in cross section and receives a third ring 61 of similar angular cross section. The ring 61 merely rests in the ring 59 and may rotate therein. A spring pressed plunger 62 is carried by the ring 59 and extends inwardly through an opening formed therein. It normally extends into a socket 63 formed in the ring 61. Thus, the plunger 62 will normally lock the ring 61 in a predetermined position in the ring 59. However, when the plunger 62 is withdrawn from the socket 63, the ring 61 may be rotated within the ring 59. I prefer to have four sockets 63 disposed 90° apart so that the ring may be locked in any of four predetermined positions for a purpose to be described later.

A condensing lens unit 64 of any suitable type is provided and is inserted within the ring 61. One of the lenses of this unit is of heat resisting glass to protect the negative from the intense heat developed by the bulb. This condensing lens unit will be disposed directly above a carrier 65 which is adapted to receive and retain a negative holder 66. The negative holder 66 will be described in detail hereinafter. The carrier 65 is secured to the rotatable ring 61. It comprises a pair of parallel angle members 67 between which the holder 66 is adapted to be slipped. Each of the angle members 67 carries a second angle member 68 on its inner surface. These angle members 68 serve as horizontal supports for the negative holder 66. Thus, it will be apparent that the carrier 65 for the negative holder 66 will rotate with the ring 61.

Secured to the members 68 is a downwardly extending tubular metal member 69. Within the lower end of this member 69 is disposed a telescoping metal tubular member 70.

The lower end of the member 70 fits within an upstanding flange formed on a disk 71 which carries at the center thereof focusing lens unit 72. The telescoping sections 69 and 70 are adjustable relative to each other to bring the apparatus into proper focus. This is accomplished by means of a rack 73 which carries a horizontal arm 74 on its lower end. This arm 74 may be removed by removing a nut 74a on the lower end of the rack 2. The arm 74 engages the member 71 and holds it in position as well as keeps the member 70 in proper telescoping relationship to the member 69. The upper portion of the rack 73 is disposed within a guide 75 formed on the member 69. The member 69 also carries a rotatable pinion 76 which engages the rack 73. A spring 77 normally keeps the pinion from rotating. However, the pinion may be rotated by means of a suitable knurled knob 78 to move the member 70 in and out of the member 69. This adjustment of the telescoping sections 69 and 70 permits making finished enlargements from negatives of films of the smallest size up to comparatively large sizes.

In order to protect the negative in the holder 66 from the intense heat developed by the bulb 54 I provide means for creating a curtain of air above the lens unit 64. This means comprises a fan 79 which is carried by the bracket 80 that is secured to the bracket 34. This fan is an electric fan and an electric conduit 79a leads upwardly therefrom into the post 2 where it is connected to the main line 57. The fan 79 is provided with a nozzle 81 which extends through the wall of the housing 42 and which is provided with a fan-shaped outlet end 82 disposed within the housing. This fan-shaped outlet end 82 will spread the air creating a curtain of air between the bulb and the negative. The hot air will escape upwardly through the housing 42 and out through the vent apertures 48 and 48a.

In Figures 8 to 13, inclusive, I illustrate the negative holder 66 which I preferably provide. This holder consists of a lower section 83 which is in the form of a frame having a glass plate 84 secured thereto by means of removable members 85. This section 83 is provided with a pair of upstanding pins 86 adjacent one edge thereof. It is also provided with a pair of guide units 87 at each end thereof. Each of these guide members is of the structure illustrated in Figure 14. It comprises a guide member 88 which is pivoted to the section 83 by means of a pin 89 at the outer end thereof. A spring 90 is disposed in surrounding relationship to the outer end of the pin and is disposed in a chamber 88 formed in the member 87. The inner end of the member 87 carries on its lower surface a ball member 91 which normally fits into a socket 92 formed in the member 83. The guide members 87 are normally in the positions illustrated in Figure 9. The spring 90 will maintain the ball 91 in the socket 92. However, the guide members may be swung to any desired position about pivot 88 and the springs 90 will tend to hold them in adjusted position, as indicated in Figure 13. The guide units 87 are provided so that the negative holder may be used with roll negatives of varying widths. It may also be used with negatives of varying lengths.

The negative holder also includes a top section 93 which consists of a rectangular frame having a glass plate 94 secured thereto by means of fastening members 95. This section 93 is provided with a pair of openings 96 which are adapted to receive the pins 86 on the section 83. It will be noted that the section 93 is shorter than the section 83. This is to permit swinging of the guide units 87 without interference, as illustrated in Figure 7. When the units 83 and 93 are superimposed, the plates 84 and 94 will grip a negative therebetween as illustrated in Figure 8. The negative used may be either of the single flat type or may be of the roll type, as illustrated in Figure 8.

When a roll type film is used, it is desirable that the holder be of such a nature that the film may be pulled easily and quickly through the holder to position a different image centrally within the holder. For this purpose a screw 97 is threaded through one of the members 67 and is provided with a tapered inner end 98 adapted to extend between the two sections 83 and 93. By adjusting this screw inwardly, the glass plates 84 and 94 will be separated slightly so that the negative may be pulled therethrough. As soon as the screw is again rotated, to withdraw the tapered end 98, the glass plates will again grip the negative. The other member 67 is provided with a similar screw 99 which is adapted to engage the edge of the lower section 83 to hold the negative holder 66 in position within the carrier 65. The negative holder 66 may be slipped in the carrier 65 and then the screw 99 may be tightened to hold it in position.

In using this apparatus, the negative is first mounted in the holder 66 in the manner indicated. Then the holder 66 is slipped into the carrier 65.

The ring 61 is rotated to properly position the image from the negative on the sensitized paper disposed on the base 1. Regardless of the position of the image on the negative, the image on the sensitized paper may be brought into a position upright relative to the operator by rotating the ring 61. Rotation of the ring 61 also rotates the carrier 65 and the telescoping unit consisting of tubes 69 and 70.

The enlarger unit 17 may be adjusted to a proper vertical position by operating the knurled knob 16. The counterbalance unit 18 will hold it in any position. If it is desired that the image be reflected on the paper disposed on base 1, the unit 17 will be in the position indicated in Figure 1. However, if it is desired to position the image on a vertical surface, such as a wall surface, the unit may be rotated about the axis of the stub 35 to reflect the image on the wall surface as illustrated in Figure 3. This is desirable when making large prints. Also, for this purpose, the unit 17 may be swung about the axis of the pin 7, as illustrated in Figure 5 so that the unit 17 will not be positioned over the base 1 and the image will be reflected on the floor. Furthermore, the adjustment of the unit 17 about the axis of the pin 7 provides for accurately positioning the unit 17 relative to the base 1 when desired.

The bulb 54 and the reflector 55 may be adjusted by means of the hand wheel 52a to properly position the bulb relative to the negative. The telescoping unit consisting of members 69 and 70 may be properly adjusted to get the apparatus in focus. The fan 79 will create an air curtain within the housing 42 and will protect the negative from intense heat. The heat resisting glass used in the lens unit 64 will also aid in protecting the negative.

It will be apparent from the above description that I have provided an enlarging apparatus having many advantages. Most of these advantages have been discussed above and others will be apparent from the drawings and from the following claims.

Having thus described my invention, what I claim is:

1. A photographic enlarger comprising a projecting unit, said projecting unit including a support, a ring carried by said support and secured thereto in fixed position, said ring having a horizontally disposed flange, a second ring disposed within the first ring and having a horizontal flange resting on the horizontal flange of the first ring, said second ring being free to rotate within the first ring, a negative holder and focusing lens unit carried by said second ring, a lens unit of cylindrical form resting on the horizontal flange of said second ring, and means for holding said lens unit in position on said ring.

2. A structure according to claim 1 wherein locking means is provided for locating and holding said second-named ring in predetermined rotating positions relative to the first-named ring.

3. A structure according to claim 1 wherein the focusing lens unit includes an adjustable telescoping tube which depends from the second-named ring.

WALTER B. MOORE.